US007746384B2

(12) United States Patent
Saitou et al.

(10) Patent No.: US 7,746,384 B2
(45) Date of Patent: Jun. 29, 2010

(54) IMAGE DATA RECORDER, IMAGE DATA RECORDING METHOD, AND PROGRAM

(75) Inventors: Yuji Saitou, Tokyo (JP); Takeshi Harada, Tokyo (JP); Tatsuhito Tabuchi, Chiba (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 11/552,213

(22) Filed: Oct. 24, 2006

(65) Prior Publication Data
US 2007/0147790 A1 Jun. 28, 2007

(30) Foreign Application Priority Data
Dec. 27, 2005 (JP) ............................. 2005-374955

(51) Int. Cl.
*H04N 5/228* (2006.01)
*H04N 11/20* (2006.01)

(52) U.S. Cl. ............ 348/222.1; 348/220.1; 348/231.99; 348/445

(58) Field of Classification Search .............. 348/220.1, 348/231.99, 231.2, 231.3, 445
See application file for complete search history.

(56) References Cited

U.S. PATENT DOCUMENTS

| | | | | | |
|---|---|---|---|---|---|
| 5,414,463 | A | * | 5/1995 | Katoh et al. | ............... 348/240.2 |
| 5,563,661 | A | * | 10/1996 | Takahashi et al. | ........ 348/390.1 |
| 5,631,710 | A | * | 5/1997 | Kamogawa et al. | ......... 348/555 |
| 6,229,574 | B1 | * | 5/2001 | Han | ............................. 348/555 |
| 2002/0106189 | A1 | * | 8/2002 | Sato et al. | ...................... 386/65 |
| 2004/0017481 | A1 | * | 1/2004 | Takasumi et al. | ....... 348/207.99 |
| 2004/0179824 | A1 | * | 9/2004 | Tsumagari et al. | ........... 386/109 |
| 2005/0083414 | A1 | * | 4/2005 | Hidaka et al. | ............. 348/220.1 |
| 2005/0180858 | A1 | * | 8/2005 | Halgas, Jr. | .................... 417/53 |
| 2006/0028571 | A1 | * | 2/2006 | Kosugi | ................... 348/333.01 |
| 2006/0114327 | A1 | * | 6/2006 | Araya et al. | ............ 348/207.99 |
| 2006/0228047 | A1 | * | 10/2006 | Harada et al. | ................ 382/298 |
| 2007/0081085 | A1 | * | 4/2007 | Ishii et al. | ............... 348/231.99 |
| 2007/0133368 | A1 | * | 6/2007 | Ueda | ........................ 369/53.1 |

FOREIGN PATENT DOCUMENTS

JP 2004-201170 7/2004

* cited by examiner

*Primary Examiner*—David L Ometz
*Assistant Examiner*—Dwight Alex C Tejano
(74) *Attorney, Agent, or Firm*—Oblon, Spivak, McClelland, Maier & Neustadt, L.L.P.

(57) ABSTRACT

An image data recorder coding a still image in accordance with a moving image coding system, and recording a still-image-converted moving image acquired by coding onto a recording medium includes: a reading unit reading out an aspect ratio set for the recording medium; a determining unit acquiring an aspect ratio of the still image, and determining whether the acquired aspect ratio is the same as the aspect ratio for the recording medium; a coding unit adding an interpolation area on the top and bottom, or left and right of the still image in accordance with the result of the determination to generate an interpolation-area-added still image whose aspect ratio matches the aspect ratio for the recording medium, and coding the interpolation-area-added still image in accordance with a moving image coding system to generate the still-image-converted moving image; and a recording unit recording the still-image-converted moving image onto the recording medium.

10 Claims, 3 Drawing Sheets

IMAGE DATA RECORDER, IMAGE DATA RECORDING METHOD, AND PROGRAM

CROSS REFERENCES TO RELATED APPLICATIONS

The present invention contains subject matter related to Japanese Patent Application JP 2005-374955 filed in the Japanese Patent Office on Dec. 27, 2005, the entire contents of which are incorporated herein by reference.

BACKGROUND OF THE INVENTION

1. Field of the Invention

The present invention relates to image data recorders, image data recording methods, and programs, and, more particularly, to an image data recorder, image data recording method, and program capable of recording both a moving image and a still image onto a recording medium, and playing back the still image using a moving image playback apparatus.

2. Description of the Related Art

Currently, there are digital video cameras that use DVDs (Digital Versatile Discs) as recording media. Such digital video cameras can capture not only moving images but also still images, and are configured to record both the captured moving and still images onto DVDs.

In addition, such digital video cameras can generate a moving image that includes one or more still images to be continuously displayed when played back and record the generated moving image (hereinafter referred to as a still-image-converted moving image) onto a DVD so that the still images that have been recorded on the DVD as the moving image can be played back by other DVD players capable of playing back only moving images (see, Japanese Unexamined Patent Application Publication No. 2004-201170).

SUMMARY OF THE INVENTION

However, in a known technique such as a technique disclosed in Japanese Unexamined Patent Application Publication No. 2004-201170, only still images having an aspect ratio of 4:3 can be converted into a still-image-converted moving image having an aspect ratio of 4:3, but a plurality of still images having different aspect ratios cannot be converted into a still-image-converted moving image.

It is desirable to provide an image data recorder, image data recording method, and program capable of generating a still-image-converted moving image in which the original aspect ratios of still images are maintained.

An image data recorder according to an embodiment of the present invention codes a still image in accordance with a moving image coding system, and records a still-image-converted moving image acquired by coding onto a recording medium. The image data recorder includes: a reading unit configured to read out an aspect ratio set for the recording medium; a determining unit configured to acquire an aspect ratio of the still image, and determine whether the acquired aspect ratio of the still image is the same as the aspect ratio set for the recording medium which has been read out; a coding unit configured to add an interpolation area on the top and bottom, or left and right of the still image in accordance with the result of determination performed by the determining unit to generate an interpolation-area-added still image whose aspect ratio matches the aspect ratio set for the recording medium, and code the interpolation-area-added still image in accordance with a moving image coding system to generate the still-image-converted moving image; and a recording unit configured to record the still-image-converted moving image onto the recording medium.

The still image can be recorded onto the recording medium.

If it has been determined by the determining unit that the acquired aspect ratio of the still image is the same as the aspect ratio set for the recording medium which has been read out, the coding unit does not add the interpolation area to the still image. If it has been determined by the determining unit that the acquired aspect ratio of the still image is not the same as the aspect ratio set for the recording medium which has been read out, the coding unit can generate the interpolation-area-added still image whose aspect ratio matches the aspect ratio set for the recording medium by adding the interpolation area on the top and bottom, or left and right of the still image.

The image data recorder can further include an image capturing unit configured to capture a moving image and generate image data corresponding to the moving image.

The recording medium can be removable.

The recording medium can be a DVD+RW.

An image data recording method according to an embodiment of the present invention for an image data recorder that codes a still image in accordance with a moving image coding system, and records a still-image-converted moving image acquired by coding onto a recording medium, the image data recording method including the steps of: reading out an aspect ratio set for the recording medium; acquiring an aspect ratio of the still image, and determining whether the acquired aspect ratio of the still image is the same as the aspect ratio set for the recording medium which has been read out; adding an interpolation area on the top and bottom, or left and right of the still image in accordance with the result of the determination to generate an interpolation-area-added still image whose aspect ratio matches the aspect ratio set for the recording medium, and coding the interpolation-area-added still image in accordance with a moving image coding system to generate the still-image-converted moving image; and recording the still-image-converted moving image onto the recording medium.

A program according to an embodiment of the present invention codes a still image in accordance with a moving image coding system, and records a still-image-converted moving image acquired by coding onto a recording medium. The program causing a computer to perform processing including the steps of: reading out an aspect ratio set for the recording medium; acquiring an aspect ratio of the still image, and determining whether the acquired aspect ratio of the still image is the same as the aspect ratio set for the recording medium which has been read out; adding an interpolation area on the top and bottom, or left and right of the still image in accordance with the result of the determination to generate an interpolation-area-added still image whose aspect ratio matches the aspect ratio set for the recording medium, and coding the interpolation-area-added still image in accordance with a moving image coding system to generate the still-image-converted moving image; and recording the still-image-converted moving image onto the recording medium.

In an embodiment of the present invention, it is determined whether the aspect ratio of a still image is the same as the aspect ratio set for a recording medium. Based on the determination, an interpolation area is added on the top and bottom, or left and right of the still image to generate an interpolation-area-added still image whose aspect ratio matches the aspect ratio set for the recording medium. The interpolation-area-added still image is coded in accordance with a moving image coding system. A still-image-converted moving image acquired by coding is recorded onto the recording medium.

Thus, according to an embodiment of the present invention, a still-image-converted moving image in which the original aspect ratios of still images are maintained can be generated.

DESCRIPTION OF THE PREFERRED EMBODIMENTS

Before describing an embodiment of the present invention, the correspondence between the features of the present invention and the embodiment disclosed in this specification or the accompanying drawings is discussed below. This description is intended to assure that the embodiment supporting the present invention is described in this specification or the accompanying drawings. Accordingly, even if the embodiment in this specification or the accompanying drawings is not described as relating to a certain feature of the present invention, that does not necessarily mean that the embodiment does not relate to that feature of the present invention. Conversely, even if the embodiment is described herein as relating to a certain feature of the present invention, that does not necessarily mean that the embodiment does not relate to other features of the present invention.

Figure 1:
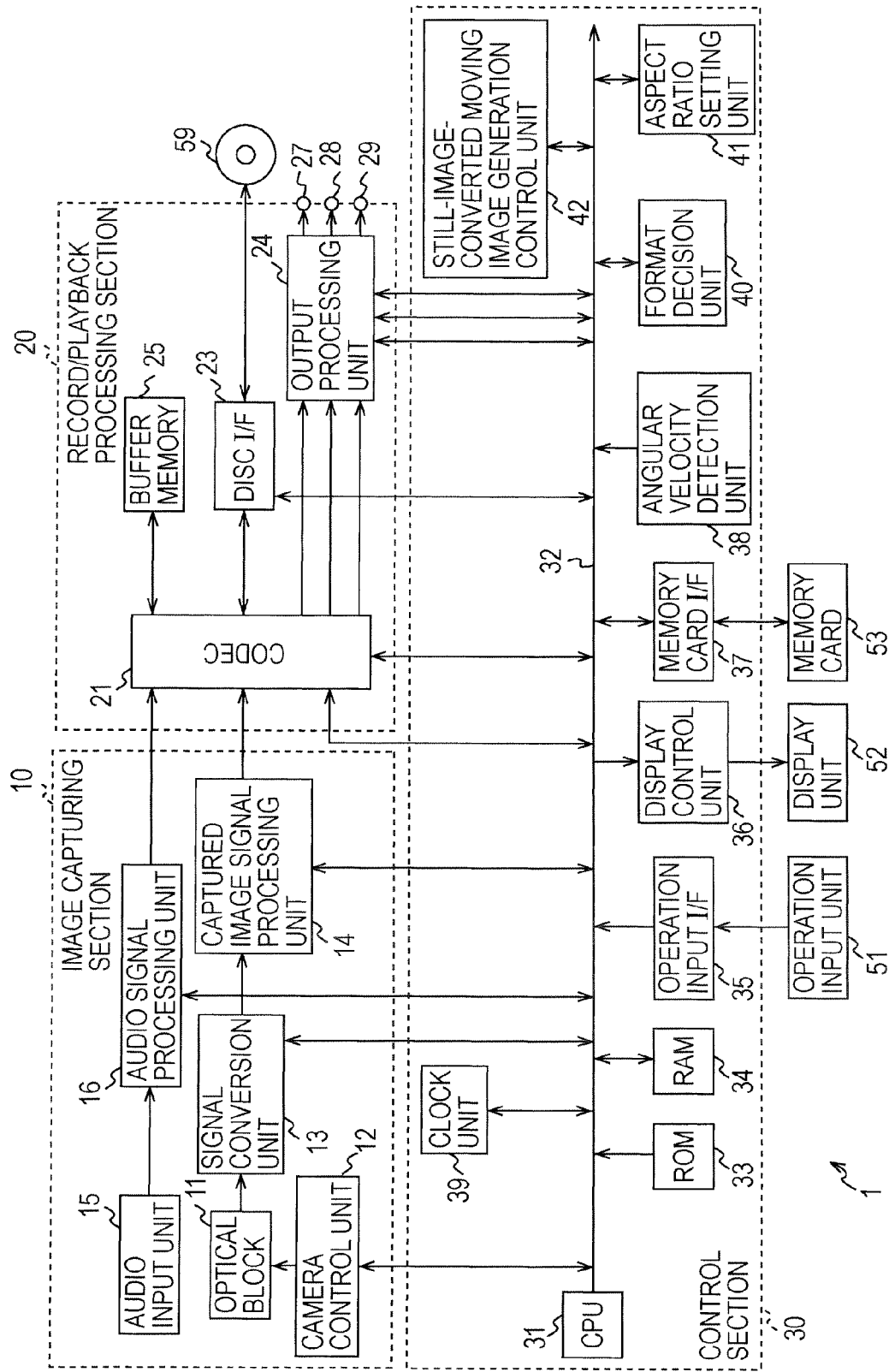
FIG. 1 is a block diagram showing an exemplary configuration of a digital video camera according to an embodiment of the present invention.

An image data recorder (for example, a digital video camera 1 shown in FIG. 1) according to an embodiment of the present invention codes a still image in accordance with a moving image coding system, and records a still-image-converted moving image acquired by coding onto a recording medium (for example, a disc 59 shown in FIG. 1). The image data recorder includes: a reading unit (for example, an aspect ratio setting unit 41 shown in FIG. 1) configured to read out an aspect ratio set for the recording medium; a determining unit (for example, a still-image-converted moving image generation control unit 42 shown in FIG. 1) configured to acquire an aspect ratio of the still image, and determine whether the acquired aspect ratio of the still image is the same as the aspect ratio set for the recording medium which has been read out; a coding unit (for example, a CODEC 21 shown in FIG. 1) configured to add an interpolation area on the top and bottom, or left and right of the still image in accordance with the result of determination performed by the determining unit to generate an interpolation-area-added still image whose aspect ratio matches the aspect ratio set for the recording medium, and code the interpolation-area-added still image in accordance with a moving image coding system to generate the still-image-converted moving image; and a recording unit (for example, a disc interface 23 shown in FIG. 1) configured to record the still-image-converted moving image onto the recording medium.

The image data recorder can further include an image capturing unit (for example, an image capturing section 10 shown in FIG. 1) configured to capture a moving image and generate image data corresponding to the moving image.

Figure 2:
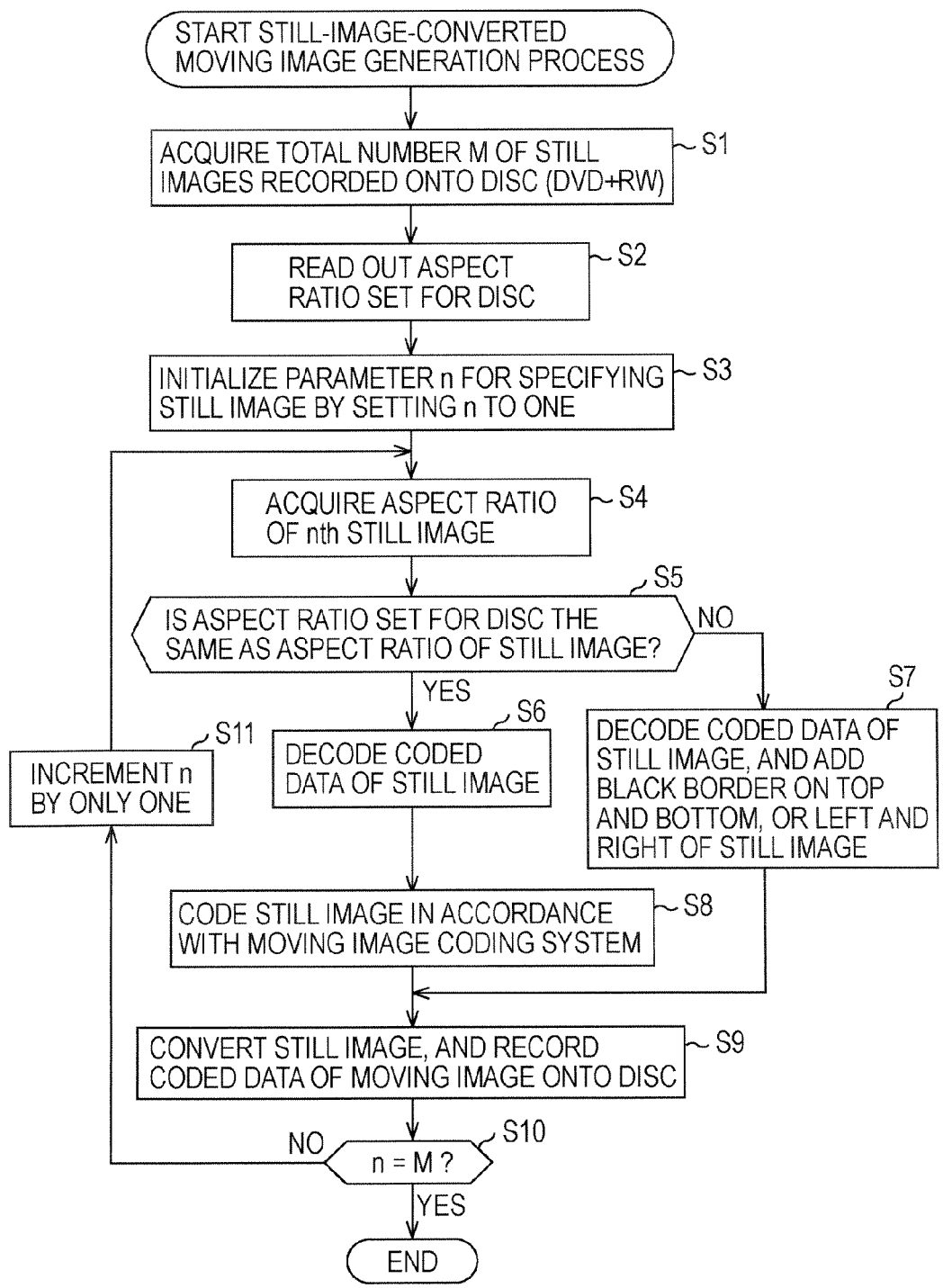
FIG. 2 is a flowchart describing a still-image-converted moving image generation process performed by the digital video camera shown in FIG. 1.

An image data recording method according to an embodiment of the present invention for an image data recorder (for example, the digital video camera 1 shown in FIG. 1) that codes a still image in accordance with a moving image coding system, and records a still-image-converted moving image acquired by coding onto a recording medium (for example, the disc 59 shown in FIG. 1), the image data recording method including the steps of: reading out an aspect ratio set for the recording medium (for example, step S2 shown in FIG. 2); acquiring an aspect ratio of the still image, and determining whether the acquired aspect ratio of the still image is the same as the aspect ratio set for the recording medium which has been read out (for example, steps S4 and S5 shown in FIG. 2); adding an interpolation area on the top and bottom, or left and right of the still image in accordance with the result of the determination to generate an interpolation-area-added still image whose aspect ratio matches the aspect ratio set for the recording medium, and coding the interpolation-area-added still image in accordance with a moving image coding system to generate the still-image-converted moving image (for example, steps S7 and S8 shown in FIG. 2); and recording the still-image-converted moving image onto the recording medium (for example, step S9 shown in FIG. 2).

A program according to an embodiment of the present invention codes a still image in accordance with a moving image coding system, and records a still-image-converted moving image acquired by coding onto a recording medium (for example, the disc 59 shown in FIG. 1). The program causing a computer to perform processing including the steps of: reading out an aspect ratio set for the recording medium (for example, step S2 shown in FIG. 2); acquiring an aspect ratio of the still image, and determining whether the acquired aspect ratio of the still image is the same as the aspect ratio set for the recording medium which has been read out (for example, steps S4 and S5 shown in FIG. 2); adding an interpolation area on the top and bottom, or left and right of the still image in accordance with the result of the determination to generate an interpolation-area-added still image whose aspect ratio matches the aspect ratio set for the recording medium, and coding the interpolation-area-added still image in accordance with a moving image coding system to generate the still-image-converted moving image (for example, steps S7 and S8 shown in FIG. 2); and recording the still-image-converted moving image onto the recording medium (for example, step S9 shown in FIG. 2).

The embodiment of the present invention will be described in detail with reference to the accompanying drawings.

FIG. 1 is a diagram showing an exemplary configuration of a digital video camera according to an embodiment of the present invention. The digital video camera 1 captures a moving image and a still image at the aspect ratios of 4:3 and 16:9, respectively, and records moving an still image data acquired by capturing onto the disc 59 that is a storage medium.

The digital video camera 1 is mainly provided with the image capturing section 10 for capturing an image of a subject and acquiring an image signal and an audio signal corresponding to the image signal, a record/playback processing section 20 for coding the image and audio signals and recording the coded image and audio signals onto the disc 59 or for reading out and playing back the image and audio signals from the disc 59, and a control section 30 for controlling the image capturing section 10 and the record/playback processing section 20.

The image capturing section 10 is provided with an optical block 11, a camera control unit 12, a signal conversion unit 13, a captured image signal processing unit 14, an audio input unit 15, and an audio signal processing unit 16. The optical block 11 contains lenses for capturing an image of a subject, a diaphragm control mechanism, a focus control mechanism, a zoom mechanism, a shutter mechanism, a flash mechanism, a camera-shake correction mechanism, etc. The camera control unit 12 generates control signals for causing the optical block 11 to perform zoom control, shutter control, exposure control, etc., and outputs the generated signals to the optical block 11 in accordance with control signals transmitted from the control section 30.

The signal conversion unit 13 is configured with an image pickup device such as a CCD (Charge Coupled Device) or CMOS (Complementary Metal-Oxide Semiconductor), and focuses the optical image of a subject which has been input via the optical block 11 onto its imaging surface, and converts the optical image of the subject focused on the imaging surface into a captured image electric signal in accordance with an image capturing timing signal that is transmitted from the control section 30 in accordance with a shutter operation, and then outputs the converted captured image signal to the captured image signal processing unit 14.

The captured image signal processing unit 14 performs gamma correction, AGC (Auto Gain Control) processing, etc. upon the received captured image signal in accordance with control signals transmitted from the control section 30, and also performs processing for converting the analog captured image signal into a digital captured image signal. The audio input unit 15 collects sounds around the subject at the time of capturing the image of the subject, and converts the collected sounds into an audio signal, and then outputs the audio signal to the audio signal processing unit 16. The audio signal processing unit 16 performs correction processing, AGC processing, etc. upon the received audio signal in accordance with control signals transmitted from the control section 30, and also performs processing for converting the analog audio signal into a digital audio signal.

The record/playback processing section 20 is provided with the CODEC (coder/decoder) 21, the disc interface (I/F) 23, an output processing unit 24, and a buffer memory 25.

The CODEC 21 performs white balance control, exposure correction control, scaling control corresponding to a digital zoom factor, etc. upon the image signal input from the captured image signal processing unit 14 in accordance with control signals transmitted from the control section 30, and codes the image and audio signals input from the image capturing section 10 in accordance with a predetermined coding system (for example, the MPEG (Moving Picture Experts Group) 2 system for a moving image signal and an audio signal, and the JPEG (Joint Photographic Experts Group) system for a still image signal), and then outputs the acquired coded data to the disc interface 23. In addition, the CODEC 21 decodes the coded data read out from the disc 59 by the disc interface 23, and provides an image signal and an audio signal acquired by decoding to the output processing unit 24. Furthermore, the CODEC 21 continuously decodes a plurality of pieces of coded data (for example, JPEG data) of one or more still images which have been recorded onto the disc 59 by the disc interface 23, and codes the decoded data again in accordance with a predetermined moving image coding system (in this case, for example, the MPEG2 system) to generate the coded data (MPEG data) of a still-image-converted moving image, and then outputs the generated coded data of the still-image-converted moving image to the disc interface 23.

The disc interface 23 records the coded data input from the CODEC 21 onto the disc 59 under the control of the control section 30, or reads out compressed data from the disc 59 and outputs the readout compressed data to the CODEC 21. The output processing unit 24 outputs the compressed data transmitted from the CODEC 21 to the control section 30 and an output terminal 27, 28, or 29 under the control of the control section 30. The buffer memory 25 is configured with, for example, an SDRAM (Synchronous Dynamic Random Access Memory), and is used by the CODEC 21 as a working area for coding and decoding. The buffer memory 25 is also used as a standby area for the data coded by the CODEC 21 until the coded data is output to the disc interface 23.

The control section 30 is provided with a CPU (Central Processing Unit) 31, a ROM (Read-Only Memory) 33, a RAM 34, an operation input interface 35 for relaying an operation signal input from an operation input unit 51 to the CPU 31, a display control unit 36 for connecting a display unit 52, a memory card interface 37 for attaching a memory card 53, an angular velocity detection unit 38 for detecting an angular velocity for camera-shake correction, a clock unit 39 for acquiring an image capturing time, a format decision unit 40 for deciding the format of the disc 59, and the aspect ratio setting unit 41 for setting an aspect ratio of an image. These units are connected to each other via a system bus 32.

The CPU 31 performs overall control of the digital video camera 1 by executing control programs stored in the ROM 33, and uses the RAM 34 as its working area. A program for controlling the image capturing section 10 and a program for performing recording and playback control of image and audio signals are written in the ROM 33 in advance.

The memory card interface 37 writes compression data transmitted from the CODEC 21 onto the memory card 53, or reads out the compression data from the memory card 53 and provides the readout compression data to the CODEC 21. The clock unit 39 generates time information representing year, month, day, hour, minute, and second.

The angular velocity detection unit 38 contains a gyroscope for detecting an angular velocity externally added to the digital video camera 1. Angular velocity information [ω=(θ/second)] detected by this gyroscope is supplied to the CPU 31 at a predetermined interval, and is used for controlling the camera-shake correction mechanism of the optical block 11.

The format decision unit 40 determines whether the disc 59 attached to the disc interface 23 has been formatted. If the disc 59 has not been formatted, the format decision unit 40 decides the type of format in accordance with a user's selection. The aspect ratio setting unit 41 sets the aspect ratio of a moving or still image in accordance with a user's selection or on the basis of information that has been already stored in the disc 59. The still-image-converted moving image generation control unit 42 causes the CODEC 21 to generate a still-image-converted moving image.

The operation input unit 51 is provided with a plurality of keys such as a mode switching key for switching between an image capture mode, a playback mode, etc., a zoom control key, an exposure control key, a shutter key for triggering capture of a still image, a recording key for capturing a moving image, a display control key for the display unit 52, a key for moving a cursor on the screen of the display unit 52, and outputs an operation signal to the operation input interface 35 in accordance with a key operation performed by a user. This operation signal is transmitted to the CPU 31 via the operation input interface 35. The CPU 31 determines which key has been operated in the operation input unit 51 in accordance with the transmitted operation signal, and performs control processing based on the result of the determination.

The display unit 52 is configured with, for example, an LCD (Liquid Crystal Display), and displays an image corresponding to an image signal (through image) output from the captured image signal processing unit 14 included in the image capturing section 10 or an image signal (playback image) read out from the disc 59. On the through image or the playback image, an icon or the like representing the state of the digital video camera 1 (for example, the amount of battery remaining or a currently set aspect ratio) is superposed and displayed. In addition, the display unit 52 also displays an operation screen that allows a user to select the types of format, aspect ratio, and recording mode.

The disc 59 is a recording media removably attached to the disc interface 23, and may be a DVD-R (Recordable), DVD-RW (ReWritable), or DVD+RW. This digital video camera 1 can initialize the DVD+RW in the DVD+VR format (hereinafter referred to as a +VR format) and the DVD-RW in the DVD-VR format (hereinafter referred to as a −VR format) or the DVD-VIDEO format (hereinafter referred to as a VIDEO format). The DVD-R is not required to be initialized.

The +VR format for the DVD+RW specifies that moving image data having only one type of aspect ratio is recorded in a predetermined area of one DVD+RW (more specifically, information having an aspect ratio of 16:9 or 4:3 is recorded). That is, it is specified that a plurality of pieces of moving image data having different aspect ratios cannot be recorded onto a single disc.

However, in the case of still images, a plurality of pieces of mixed coded data of still images that have aspect ratios of 16:9 and 4:3 can be recorded irrespective of an aspect ratio set for the disc 59 that is a DVD+RW.

Next, the operation of the digital video camera 1 will be described.

FIG. 2 is a flowchart describing the still-image-converted moving image generation process performed by the digital video camera 1. This process is started when a user gives an instruction for still-image-converted moving image generation by performing a predetermined operation. Here, the disc 59 is a DVD+RW, and coded still image data (for example, JPEG data) has been already recorded onto the disc 59.

In step S1, the still-image-converted moving image generation control unit 42 acquires the total number M of still images recorded onto the disc 59 by controlling the disc interface 23. In step S2, the aspect ratio setting unit 41 reads out an aspect ratio set for the disc 59 (an aspect ratio recorded in a predetermined area of the disc 59), that is, an aspect ratio uniformly set for moving images recorded onto the disc 59, and supplies the aspect ratio to the still-image-converted moving image generation control unit 42. In step S3, the still-image-converted moving image generation control unit 42 initializes a parameter n for specifying a still image recorded onto the disc 59 by setting n to one.

In step S4, the CODEC 21 acquires via the disc interface 23 the coded data of an nth still image which has been recorded onto the disc 59 under the control of the still-image-converted moving image generation control unit 42, and detects the aspect ratio of the acquired coded data, and then supplies the detected aspect ratio to the still-image-converted moving image generation control unit 42. In step S5, the still-image-converted moving image generation control unit 42 determines whether the aspect ratio set for the disc 59 is the same as the aspect ratio of the nth still image.

If it has been determined that the aspect ratio set for the disc 59 is the same as the aspect ratio of the nth still image in step S5, the process proceeds to step S6. In step S6, the CODEC 21 decodes the coded data of the nth still image under the control of the still-image-converted moving image generation control unit 42. A still image acquired by decoding is a still image on the top and bottom, or left and right of which a black border is not added as shown in (A) and (D) in FIG. 3. Subsequently, the process proceeds to step S8.

In contrast, if it has been determined that the aspect ratio set for the disc 59 is not the same as the aspect ratio of the nth still image in step S5, the process proceeds to step S7. In step S7, the CODEC 21 decodes the coded data of the nth still image under the control of the still-image-converted moving image generation control unit 42, and adds a black border on the top and bottom, or left and right of a still image acquired by decoding.

Figure 3:
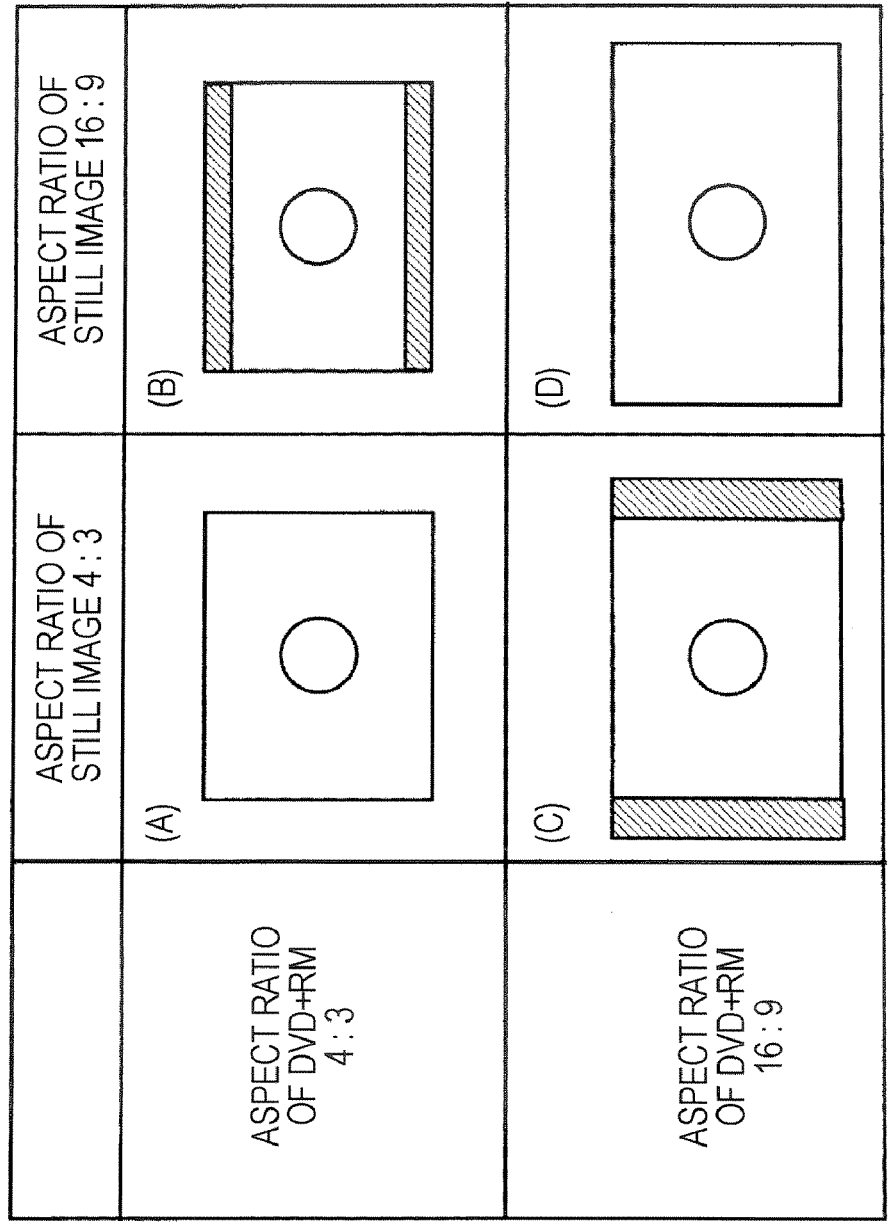
FIG. 3 is a diagram showing positions of black borders added to still images.

More specifically, if an aspect ratio of 16:9 is set for the disc 59 and the nth still image has an aspect ratio of 4:3, a black border is added on the left and right of the still image that is a result of decoding as shown in (C) in FIG. 3. If an aspect ratio of 4:3 is set for the disc 59 and the nth still image has an aspect ratio of 16:9, a black border is added on the top and bottom of the still image that is a result of decoding as shown in (B) in FIG. 3. Subsequently, the process proceeds to step S8.

Here, instead of adding the black border to the image that is a result of decoding, the nth still image may be pasted on a black background image. The color of a border to be added or a background image may be a color other than black.

In step S8, the CODEC 21 codes the still image that is a processing result of step S6 or S7 in accordance with a moving image coding system (for example, the MPEG2 system) under the control of the still-image-converted moving image generation control unit 42, and outputs the coded data of a still-image-converted moving image acquired by coding to the disc interface 23. In step S9, the disc interface 23 records the received coded data of the still-image-converted moving image onto the disc 59.

In step S10, the still-image-converted moving image generation control unit 42 determines whether the value of the parameter n is the same as the total number of still images M. If it has been determined that the value of the parameter n is not the same as the total number of still images M, the process proceeds to step S11 and the value of the parameter n is incremented by one. Subsequently, the process returns to step S4, and the process from step S4 to step S11 is repeated.

If it has been determined that the value of the parameter n is the same as the total number of still images M, the still-image-converted moving image generation process ends.

According to the above-described still-image-converted moving image generation process, the coded data of still images is maintained, and the coded data of a still-image-converted moving image corresponding to the still images is recorded onto the disc 59. Accordingly, even if the disc 59 is played back by a moving image playback apparatus, the still-image-converted moving image corresponding to the recorded still images can be displayed without altering the original aspect ratios of the still images.

Even in a case where the disc 59 is not a DVD+RW, the above-described still-image-converted moving image generation process can be similarly performed.

The present invention may be applied to not only a video camera but also a video recorder, etc.

In this specification, steps executed in accordance with a program are not necessarily required to be performed in chronological order as described above. The steps may be performed concurrently or individually.

The program may be processed by a single computer or processed by a plurality of computers in a distributed manner. Furthermore, the program may be transferred to a remote computer so as to be executed in that computer.

It should be understood by those skilled in the art that various modifications, combinations, sub-combinations and alterations may occur depending on design requirements and other factors insofar as they are within the scope of the appended claims or the equivalents thereof.

What is claimed is:

1. An image data recorder that codes a still image in accordance with a moving image coding system, and records a still-image-converted moving image acquired by coding onto a recording medium, the image data recorder comprising:
    reading means for reading out an aspect ratio that was set for the recording medium when the recording medium was formatted;
    determining means for acquiring an aspect ratio of the still image recorded on the recording medium, and determining whether the acquired aspect ratio of the still image is the same as the aspect ratio set for the recording medium that has been read out;
    coding means for adding, based on the aspect ratio set for the recording medium that has been read out, an interpolation area on the top and bottom, or left and right of the still image in accordance with the result of determination performed by the determining means to generate an interpolation-area-added still image whose aspect ratio matches the aspect ratio set for the recording medium that has been read out, and coding the interpolation-area-added still image in accordance with a moving image coding system to generate the still-image-converted moving image; and
    recording means for recording the still-image-converted moving image onto the recording medium.

2. The image data recorder according to claim 1, wherein the still image is recorded onto the recording medium.

3. The image data recorder according to claim 1,
    wherein if it has been determined by the determining means that the acquired aspect ratio of the still image is the same as the aspect ratio set for the recording medium that has been read out, the coding means does not add the interpolation area to the still image, and
    wherein if it has been determined by the determining means that the acquired aspect ratio of the still image is not the same as the aspect ratio set for the recording medium that has been read out, the coding means generates the interpolation-area-added still image whose aspect ratio matches the aspect ratio set for the recording medium that has been read out by adding the interpolation area on the top and bottom, or left and right of the still image.

4. The image data recorder according to claim 1, further comprising:
    image capturing means for capturing a moving image and generating image data corresponding to the moving image.

5. The image data recorder according to claim 1, wherein the recording medium is removable.

6. The image data recorder according to claim 1, wherein the recording medium is a DVD+RW (Digital Versatile Disc ReWritable).

7. An image data recording method for an image data recorder that codes a still image in accordance with a moving image coding system, and records a still-image-converted moving image acquired by coding onto a recording medium, the image data recording method comprising:
    reading out an aspect ratio that was set for the recording medium when the recording medium was formatted;
    acquiring an aspect ratio of the still image recorded on the recording medium, and determining whether the acquired aspect ratio of the still image is the same as the aspect ratio set for the recording medium that has been read out;
    adding, based on the aspect ratio that was set for the recording medium that has been read out, an interpolation area on the top and bottom, or left and right of the still image in accordance with the result of the determination to generate an interpolation-area-added still image whose aspect ratio matches the aspect ratio set for the recording medium that has been read out, and coding the interpolation-area-added still image in accordance with a moving image coding system to generate the still-image-converted moving image; and
    recording the still-image-converted moving image onto the recording medium.

8. A computer-readable storage medium encoded with computer program instructions that when executed by a processor cause the processor to execute a method for coding a still image in accordance with a moving image coding system, and recording a still-image-converted moving image acquired by coding onto a recording medium, comprising:
    reading out an aspect ratio that was set for the recording medium when the recording medium was formatted;
    acquiring an aspect ratio of the still image recorded on the recording medium, and determining whether the acquired aspect ratio of the still image is the same as the aspect ratio set for the recording medium that has been read out;
    adding, based on the aspect ratio that was set for the recording medium that has been read out, an interpolation area on the top and bottom, or left and right of the still image in accordance with the result of the determination to generate an interpolation-area-added still image whose aspect ratio matches the aspect ratio set for the recording medium that has been read out, and coding the interpolation-area-added still image in accordance with a moving image coding system to generate the still-image-converted moving image; and
    recording the still-image-converted moving image onto the recording medium.

9. An image data recorder that codes a still image in accordance with a moving image coding system, and records a still-image-converted moving image acquired by coding onto a recording medium, the image data recorder comprising:
    a reading unit configured to read out an aspect ratio that was set for the recording medium when the recording medium was formatted;
    a determining unit configured to acquire an aspect ratio of the still image recorded on the recording medium, and determine whether the acquired aspect ratio of the still image is the same as the aspect ratio set for the recording medium that has been read out;
    a coding unit configured to, based on the aspect ratio set for the recording medium that has been read out, add an interpolation area on the top and bottom, or left and right of the still image in accordance with the result of determination performed by the determining unit to generate an interpolation-area-added still image whose aspect ratio matches the aspect ratio set for the recording medium that has been read out, and code the interpolation-area-added still image in accordance with a moving image coding system to generate the still-image-converted moving image; and
    a recording unit configured to record the still-image-converted moving image onto the recording medium.

10. The image data recorder according to claim 1, wherein a user selects the aspect ratio for the recording medium when the recording medium has not been formatted and the recording medium is formatted according to the aspect ratio selected by the user.

* * * * *